(12) United States Patent
Hafner et al.

(10) Patent No.: US 11,480,070 B2
(45) Date of Patent: Oct. 25, 2022

(54) COOLANT DELIVERY VIA AN INDEPENDENT COOLING CIRCUIT

(71) Applicant: General Electric Company, Schenectady, NY (US)

(72) Inventors: Matthew Troy Hafner, Honea Path, SC (US); Brad Wilson VanTassel, Easley, SC (US); Christopher Donald Porter, Greenville, SC (US); Srikanth Chandrudu Kottilingam, Greenville, SC (US)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 16/663,873

(22) Filed: Oct. 25, 2019

(65) Prior Publication Data

US 2022/0205363 A1 Jun. 30, 2022

(51) Int. Cl.
*F01D 5/18* (2006.01)
*F01D 25/12* (2006.01)
(Continued)

(52) U.S. Cl.
CPC ............. *F01D 25/12* (2013.01); *F01D 5/187* (2013.01); *F01D 25/14* (2013.01); *F23R 3/002* (2013.01);
(Continued)

(58) Field of Classification Search
CPC . F01D 5/18; F01D 5/188; F01D 5/189; F01D 5/182; F01D 5/186; F01D 5/187;
(Continued)

(56) References Cited

U.S. PATENT DOCUMENTS

| 3,742,706 A | 7/1973 | Klompas |
| 5,340,274 A | 8/1994 | Cunha |

(Continued)

FOREIGN PATENT DOCUMENTS

| EP | 1375825 A1 | 1/2004 |
| EP | 3054105 A1 | 8/2016 |

(Continued)

OTHER PUBLICATIONS

U.S. Appl. No. 16/663,941, Office Action dated Aug. 16, 2021, 18 pgs.

(Continued)

*Primary Examiner* — Eric J Zamora Alvarez
(74) *Attorney, Agent, or Firm* — Hoffman Warnick LLC

(57) ABSTRACT

A coolant delivery system for a component of a gas turbine system includes: a plurality of independent circuits of cooling channels embedded within an exterior wall of the component, each independent circuit of cooling channels including a plurality of headers and a plurality of feed tubes fluidly coupling the plurality of headers to a supply of cooling fluid; and an impingement plate connected to the exterior wall of the component by the plurality of feed tubes of the independent circuits of cooling channels, wherein, in each of the plurality of independent circuits of cooling channels, the cooling fluid flows through the plurality of feed tubes and the plurality of headers into the circuit of cooling channels only in response to a formation of a breach in the exterior wall of the component that exposes at least one of the cooling channels of the circuit of cooling channels.

13 Claims, 16 Drawing Sheets

(51) Int. Cl.
  *F01D 25/14* (2006.01)
  *F23R 3/00* (2006.01)
  *B33Y 80/00* (2015.01)
(52) U.S. Cl.
  CPC .......... *B33Y 80/00* (2014.12); *F05D 2230/31* (2013.01); *F05D 2260/201* (2013.01); *F05D 2260/202* (2013.01); *F05D 2260/205* (2013.01); *F05D 2260/2214* (2013.01); *F23R 2900/03044* (2013.01)
(58) Field of Classification Search
  CPC . F01D 5/288; F01D 5/147; F01D 5/14; F01D 5/005; F01D 9/041; F01D 25/12; F01D 25/14; B33Y 80/00; F05D 2230/31; F05D 2230/51; F05D 2260/201; F05D 2260/202; F05D 2260/204; F05D 2260/84; F05D 2260/205; F05B 2250/191
  See application file for complete search history.

(56) References Cited

U.S. PATENT DOCUMENTS

| | | | |
|---|---|---|---|
| 5,993,150 | A | 11/1999 | Liotta et al. |
| 6,974,308 | B2 | 12/2005 | Halfmann et al. |
| 7,118,326 | B2 | 10/2006 | Liang |
| 7,658,590 | B1 | 2/2010 | Spanks |
| 8,727,727 | B2 | 5/2014 | Bunker et al. |
| 10,443,437 | B2 | 10/2019 | Lacy et al. |
| 10,767,492 | B2 | 9/2020 | Webster et al. |
| 10,830,058 | B2 | 11/2020 | Barker et al. |
| 10,995,621 | B2 | 5/2021 | Hafner et al. |
| 2003/0231955 | A1 | 12/2003 | Barry et al. |
| 2009/0074576 | A1 | 3/2009 | Brostmeyer |
| 2015/0218951 | A1 | 8/2015 | Weaver |
| 2018/0016917 | A1 | 1/2018 | Tallman et al. |
| 2018/0045057 | A1 | 2/2018 | Tallman et al. |
| 2018/0135458 | A1 | 5/2018 | Hudson et al. |
| 2018/0347372 | A1 | 12/2018 | Lacy et al. |
| 2019/0309634 | A1 | 10/2019 | Itzel et al. |
| 2020/0240273 | A1 | 7/2020 | Tallman et al. |

FOREIGN PATENT DOCUMENTS

| | | |
|---|---|---|
| EP | 3409890 A1 | 12/2018 |
| EP | 3409891 A1 | 12/2018 |
| WO | 2019074514 A1 | 4/2019 |

OTHER PUBLICATIONS

PCT Search Report and Written Opinion for corresponding PCT Application No. PCT/US2020/047382 dated Oct. 22, 2020, 28 pages.

PCT Search Report and Written Opinion for corresponding PCT Application No. PCT/US2020/047569 dated Nov. 27, 2020, 12 pages.

International Search Report for corresponding PCT Application No. PCT/US2020/047574 dated Feb. 18, 2021, 15 pages.

Notice of Allowance and Fee(s) Due dated Sep. 29, 2021 for U.S. Appl. No. 16/663,941, filed Oct. 25, 2019; pp. 10.

Notification Concerning Transmittal of International Preliminary Report on Patentability and Written Opinion of the International Searching Authority dated May 5, 2022 for PCT/US2020/047382 filed Aug. 21, 2020; pp. 9.

Office Action dated Mar. 29, 2022 for U.S. Appl. No. 16/663,912, filed Oct. 25, 2019; pp. 23.

Notification Concerning Transmittal of International Preliminary Report on Patentability and Written Opinion dated May 5, 2022 for PCT/US2020/047569 filed Aug. 24, 2020; pp. 7.

Notice of Allowance and Fee(s) Due dated May 26, 2022 for U.S. Appl. No. 16/663,912, filed Oct. 25, 2019; pp. 19.

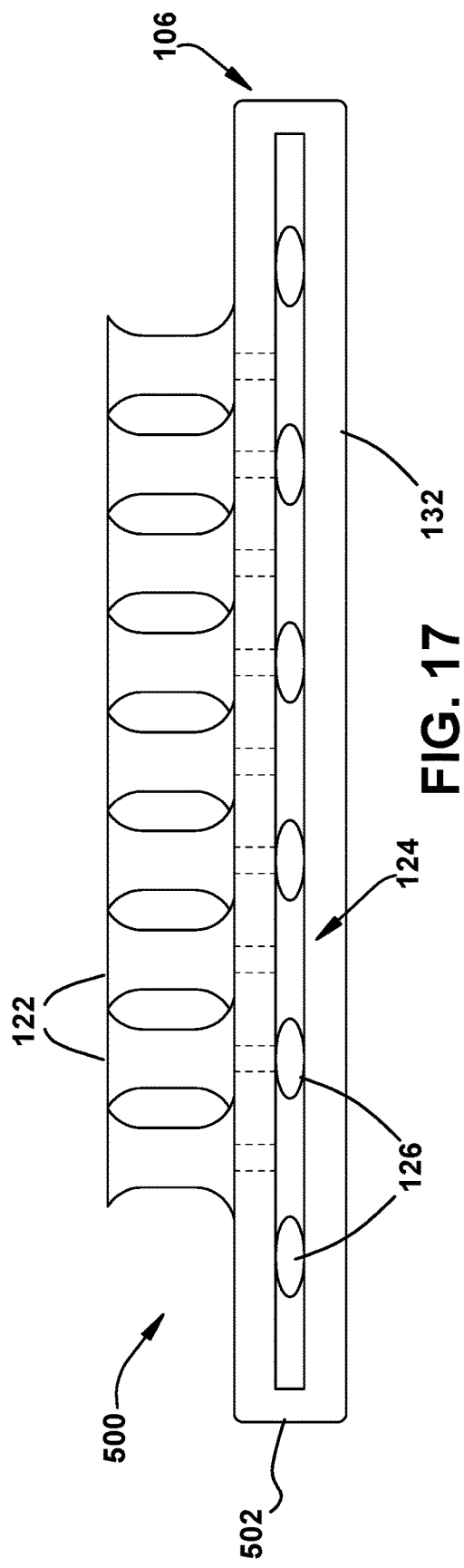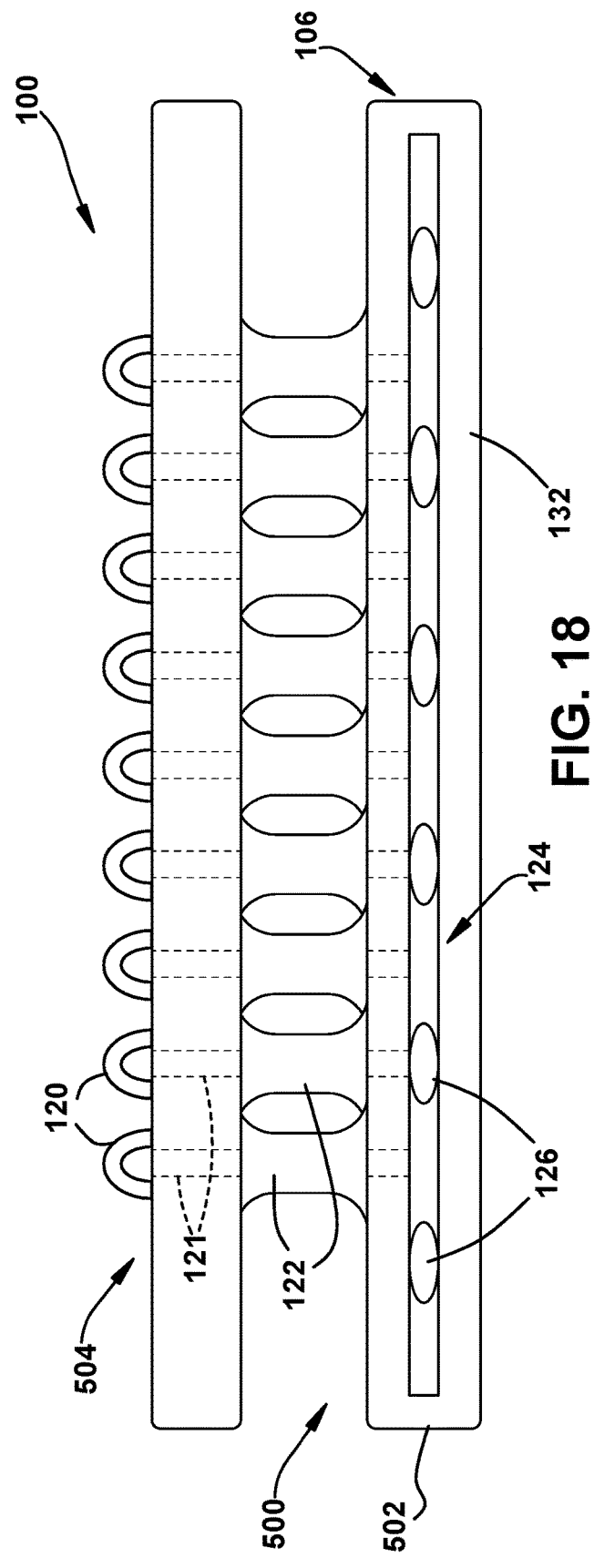

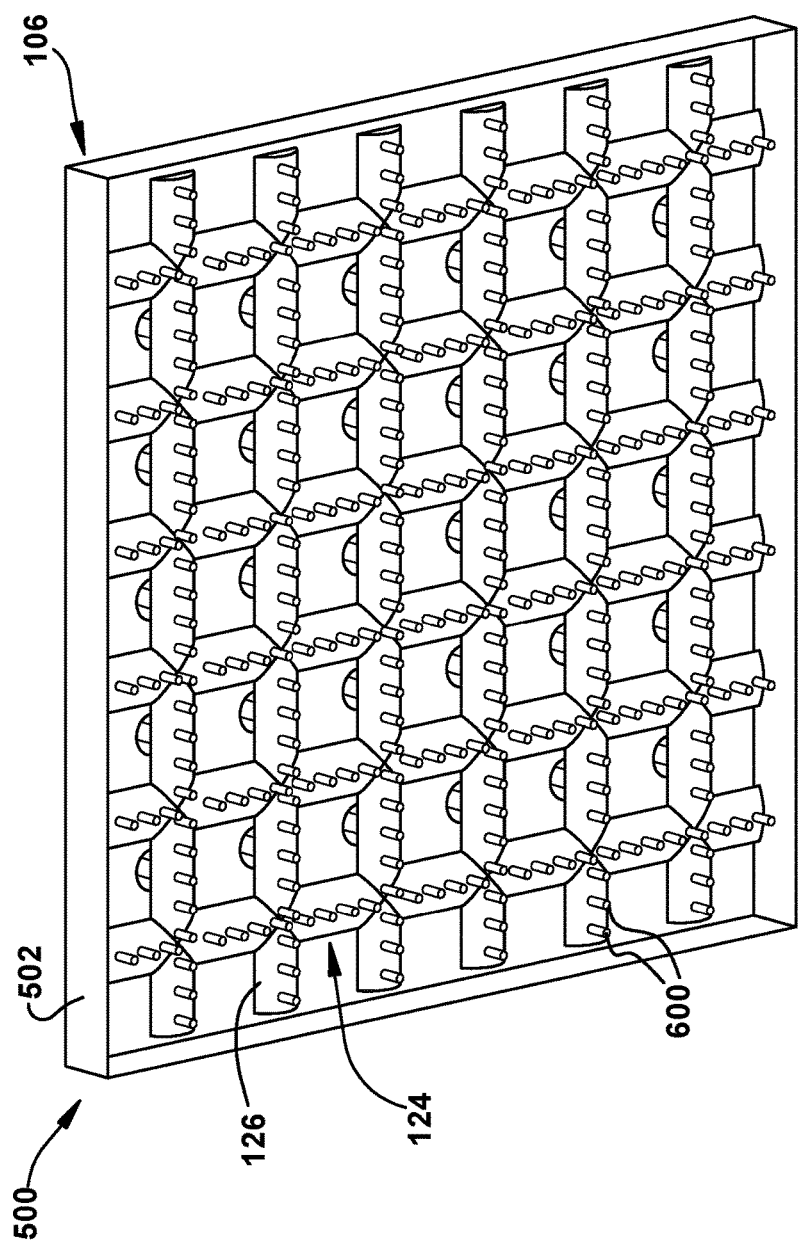
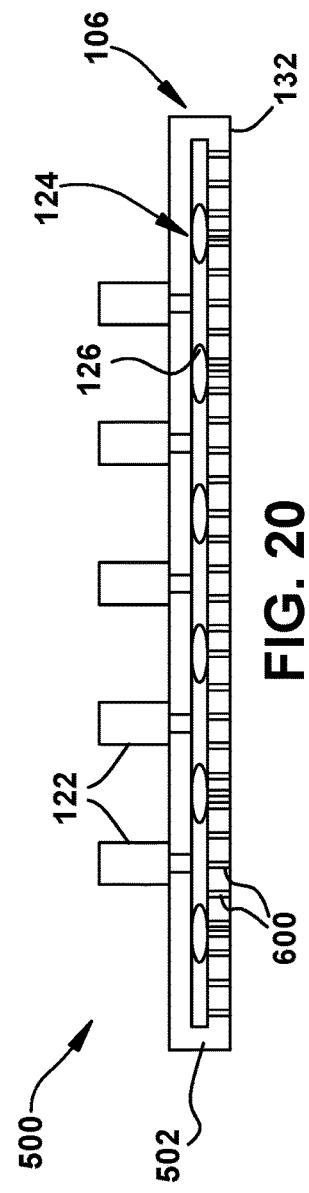
FIG. 19
FIG. 20

COOLANT DELIVERY VIA AN INDEPENDENT COOLING CIRCUIT

STATEMENT REGARDING FEDERALLY SPONSORED RESEARCH OR DEVELOPMENT

This invention was made with government support under contract DE-FE0031611 awarded by the United States Department of Energy. The government has certain rights.

BACKGROUND

The disclosure relates generally to turbine systems, and more particularly, to the delivery of cooling fluid to a component of a gas turbine system via an independent cooling circuit.

Gas turbine systems are one example of turbomachines widely utilized in fields such as power generation. A conventional gas turbine system generally includes a compressor section, a combustor section, and a turbine section. During operation of a gas turbine system, various components in the system, such as turbine blades, nozzle airfoils, and shroud segments are subjected to high temperature gas flows, which can cause the components to fail. Since higher temperature gas flows generally result in increased performance, efficiency, and power output of a gas turbine system, it is advantageous to cool the components that are subjected to high temperature gas flows to allow the gas turbine system to operate at increased temperatures and to extend the lifetime of the components of a gas turbine system.

Cooling (e.g., convection cooling, impingement cooling, etc.) is often provided by directing a flow of a cooling fluid through internal passages formed in the components of the gas turbine system. In many cases, the cooling fluid is provided by bleeding off a portion of the air discharged by the compressor section of the gas turbine system.

A thermal barrier coating (TBC) is often applied to the components of a gas turbine system to provide a protective heat shield, prevent damage due to high temperatures, and extend component life by reducing oxidation and thermal fatigue. Spallation of the TBC is a common issue in gas turbine systems. When the TBC spalls, portions of the TBC may crack and break off a component, exposing underlying surfaces to high temperatures and damage (e.g., a wall breach).

SUMMARY

An aspect of the disclosure is directed to a cooling delivery system for selectively delivering a flow of cooling fluid to a component of a gas turbine system, including: a plurality of independent circuits of cooling channels embedded within an exterior wall of the component, each independent circuit of cooling channels including a plurality of headers and a plurality of feed tubes fluidly coupling the plurality of headers to a supply of cooling fluid; and an impingement plate connected to the exterior wall of the component by the plurality of feed tubes of the independent circuits of cooling channels, wherein, in each of the plurality of independent circuits of cooling channels, the cooling fluid flows through the plurality of feed tubes and the plurality of headers into the circuit of cooling channels only in response to a formation of a breach in the exterior wall of the component that exposes at least one of the cooling channels of the circuit of cooling channels.

Another aspect of the disclosure is directed to a gas turbine system, including: a component of a gas turbine system; and a cooling system for the component, the cooling system including: a plurality of independent circuits of cooling channels embedded within an exterior wall of the component, each independent circuit of cooling channels including a plurality of headers and a plurality of feed tubes fluidly coupling the plurality of headers to a supply of cooling fluid; and an impingement plate connected to the exterior wall of the component by the plurality of feed tubes of the plurality of independent circuits of cooling channels, wherein, in each of the plurality of independent circuits of cooling channels, the cooling fluid flows through the plurality of feed tubes and the plurality of headers into the circuit of cooling channels only in response to a formation of a breach in the exterior wall of the component that exposes at least one of the cooling channels of the circuit of cooling channels.

A further aspect of the disclosure is directed to a method for reducing spallation-related damage to a component of a gas turbine system, comprising: embedding a plurality of independent circuits of cooling channels within a section of an external wall of the component, wherein the cooling channels of each of the plurality of circuits of cooling channels are non-linear, interwoven, and extend unidirectionally within the exterior wall of the component; and directing a flow of cooling fluid into at least one of the plurality of circuits of cooling channels only in response to a wall breach exposing a portion of the at least one of the plurality of circuits of cooling channels.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

FIGS. 17 and 18 depict an additively manufactured wall coupon for a component of a gas turbine system according to embodiments.

FIGS. 19 and 20 depict an additively manufactured wall coupon with powder removal openings according to embodiments.

Figure 1:
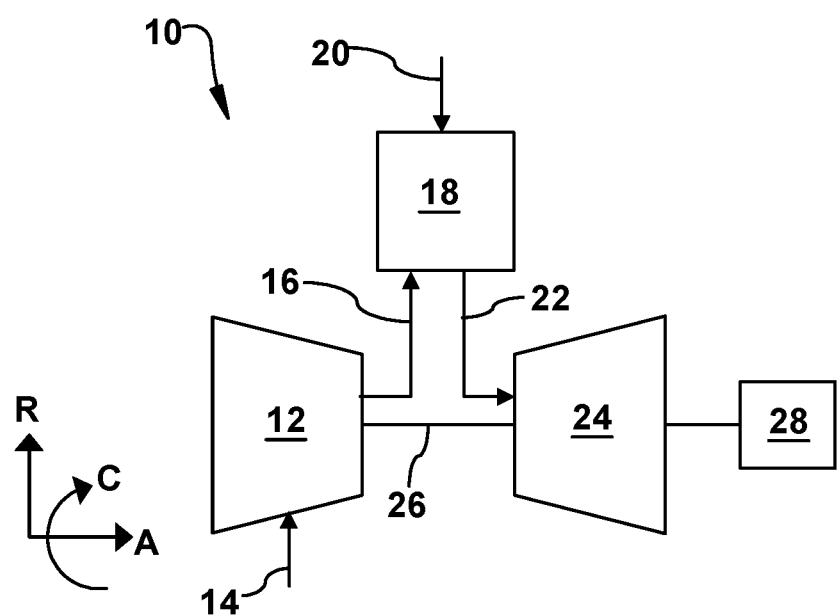
FIG. 1 depicts a schematic diagram of a gas turbine system according to embodiments.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As an initial matter, in order to clearly describe the current disclosure, it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the gas turbine system (in particular, the rotor section). As further used herein, the terms "radial" and/or "radially" refer to the relative position/direction of objects along a direction "R" (see, FIG. 1), which is substantially perpendicular with axis A and intersects axis A at only one location. Finally, the term "circumferential" refers to movement or position around axis A (e.g., direction "C").

In various embodiments, components described as being "fluidly coupled" to or "in fluid communication" with one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

FIG. 1 depicts a schematic diagram of a gas turbine system 10 according to various embodiments. As shown, the gas turbine system 10 includes a compressor section 12 for compressing an incoming flow of air 14 and for delivering a flow of compressed air 16 to a combustor section 18. The combustor section 18 mixes the flow of compressed air 16 with a pressurized supply of fuel 20 and ignites the mixture to create a flow of combustion gases 22. Although only a single combustor section 18 is shown, the gas turbine system 10 may include any number of combustor sections 18. The flow of combustion gases 22 is in turn delivered to a turbine section 24. The flow of combustion gases 22 drives the turbine section 24 to produce mechanical work. The mechanical work produced in the turbine section 24 drives the compressor section 12 via a shaft 26 and may be used to drive an external load 28, such as an electrical generator and/or the like.

Figure 2:
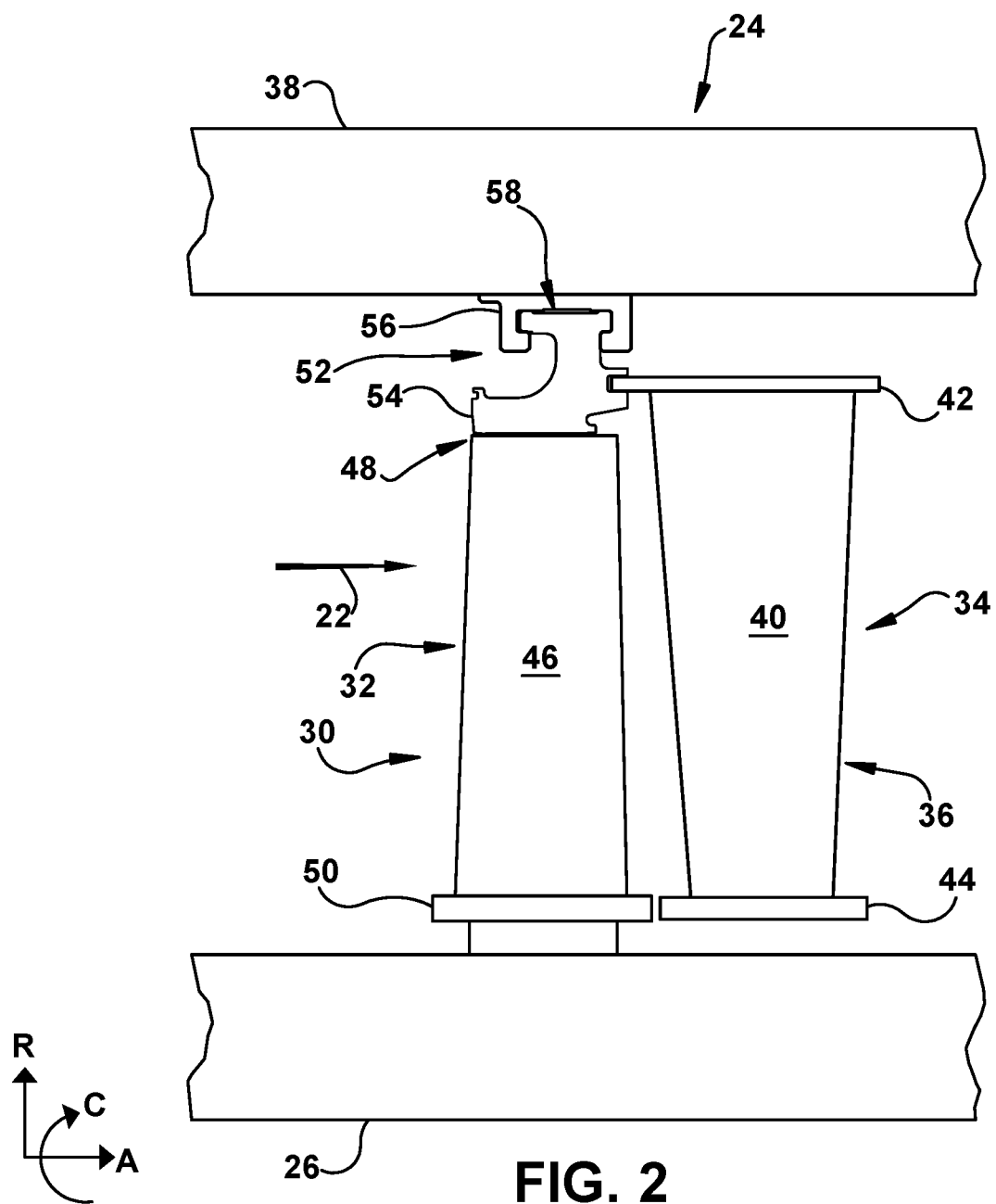
FIG. 2 depicts a side view of a portion of a turbine section of a gas turbine system according to embodiments.

FIG. 2 depicts a side view of a portion of a turbine section 24 of a gas turbine system, including at least one stage 30 of turbine blades 32 (one shown) and at least one stage 34 of nozzles 36 (one shown) positioned within a casing 38 of the turbine section 24. Each stage 30 of turbine blades 32 includes a plurality of turbine blades 32 that are coupled to and positioned circumferentially about the rotor 26, and which are driven by the combustion gases 22. Each stage 34 of nozzles 36 includes a plurality of nozzles 36 that are coupled to and positioned circumferentially about the casing 38 of the turbine section 24. In the embodiment shown in FIG. 2, each nozzle 36 includes an airfoil 40 positioned between an outer platform 42 and an inner platform 44.

Similar to the nozzles 36, each turbine blade 32 of the turbine section 24 includes an airfoil 46 extending radially from the rotor 26. Each airfoil 46 includes a tip portion 48 and a platform 50 positioned opposite the tip portion 48.

The turbine blades 32 and the nozzles 36 may be positioned axially adjacent to one another within the casing 38. In FIG. 2, for example, the nozzles 36 are shown positioned axially adjacent and downstream of the turbine blades 32. The turbine section 24 may include a plurality of stages 30 of turbine blades 32 and a plurality of stages 34 of nozzles 36, positioned axially throughout the casing 38.

The turbine section 24 of the gas turbine system 10 may include a plurality of stages 52 of shrouds 54 (one stage shown in FIG. 2) positioned axially throughout the casing 38. In FIG. 2, for example, the stage 52 of shrouds 54 is shown positioned radially adjacent to and substantially surrounding or encircling the stage 30 of turbine blades 32. The stage 52 of shrouds 54 may also be positioned axially adjacent and/or upstream of the stage 34 of nozzles 36. Further, the stage 52 of shrouds 54 may be positioned between two adjacent stages 34 of nozzles 36 located on opposing sides of a stage 30 of turbine blades 32. The stage 52 of shrouds 54 may be coupled about the casing 38 of the turbine section 24 using a set of extensions 56, each including an opening 58 configured to receive a corresponding section of a shroud 54.

Figure 3:
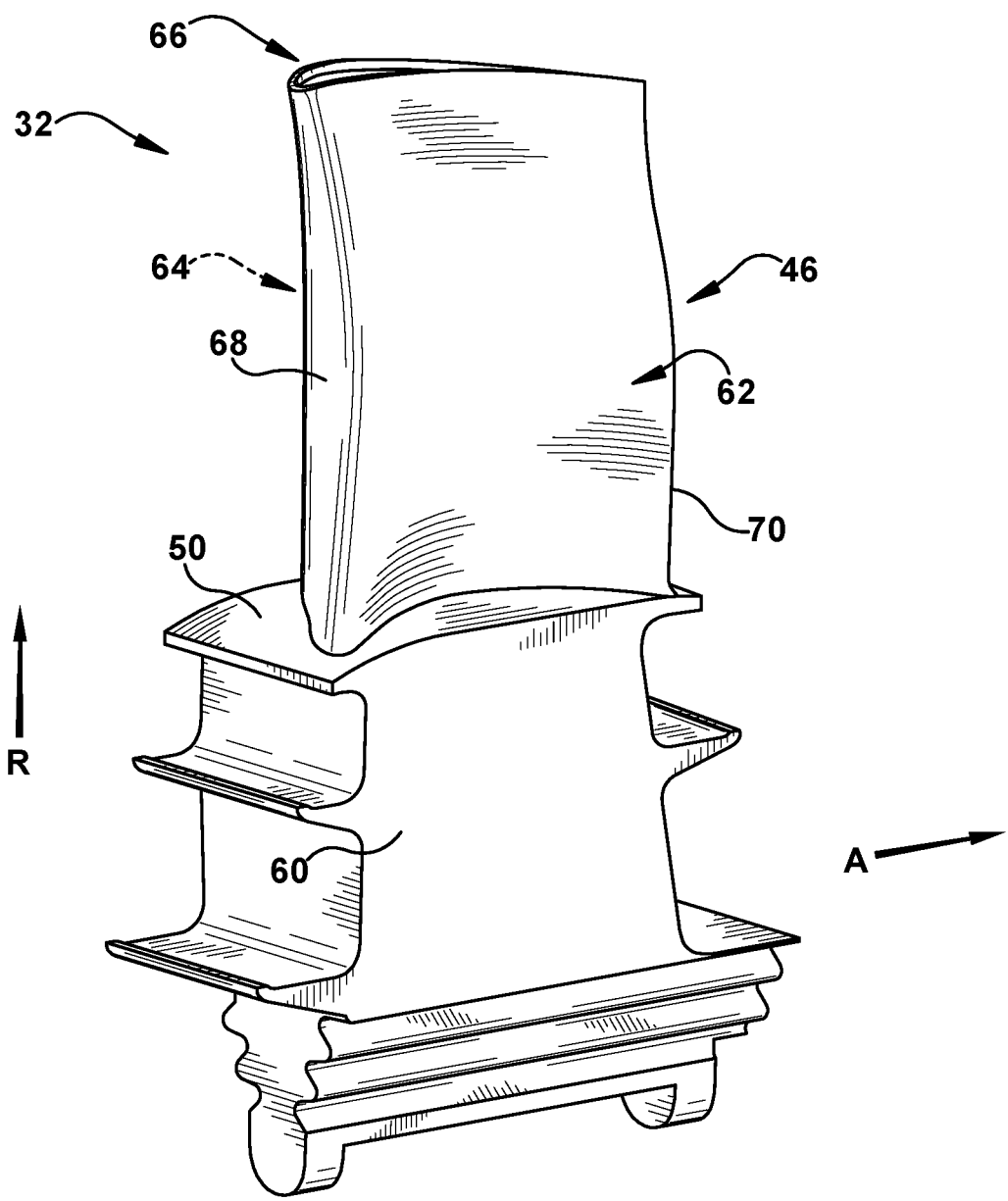
FIG. 3 depicts a perspective view of a turbine blade according to embodiments.

Turning to FIG. 3, a perspective view of a turbine blade 32 is shown. The turbine blade 32 includes a shank 60, a platform 50 located radially above the platform 50, and an airfoil 46 coupled to and extending radially outward from the platform 50. The airfoil 46 includes a pressure side 62, an opposed suction side 64, and a tip portion 48. The airfoil 46 further includes a leading edge 68 between the pressure side 62 and the suction side 64, as well as a trailing edge 70 between the pressure side 62 and suction side 64 on a side opposing the leading edge 68.

Many components of a gas turbine system (e.g., turbine blades, nozzles, shrouds, etc.) may be cooled during operation by directing a fixed supply of a cooling fluid through internal passages formed in the components. In many cases, the cooling fluid is provided by bleeding off a fixed supply of air discharged by the compressor section of the gas turbine system.

Many different internal cooling methodologies may be used to cool a component of a gas turbine system including, for example, convection cooling, film cooling, and impingement cooling. Convection cooling works by passing a flow of a cooling fluid through passages internal to the component. Heat is transferred by conduction through the component, and then to the cooling fluid flowing through the component. With film cooling, cooling fluid is discharged to an external surface of the component via small holes formed through an exterior wall of the component. The cooling fluid provides a thin, cool, insulating blanket along the external surface of the component. Impingement cooling, a variation of convection cooling, works by directing a higher velocity flow of a cooling fluid against an interior surface of the component. This allows more heat to be transferred by convection than regular convection cooling. Impingement cooling is often used in regions of the component exposed to high heat loads (e.g., the leading edge of a turbine blade).

If a breach forms (e.g., as a consequence of TBC spallation or other damage) in a portion of a component of a gas turbine system and exposes any internal cooling passages, some of the fixed supply of cooling fluid may flow from the exposed internal cooling passages and out of the component through the breach. This reduces the remaining amount of the fixed supply of cooling fluid available to the component, decreasing cooling effectiveness, and potentially resulting in component failure. An example of such a wall breach is depicted in FIGS. 4A and 4B.

Figure 4A:
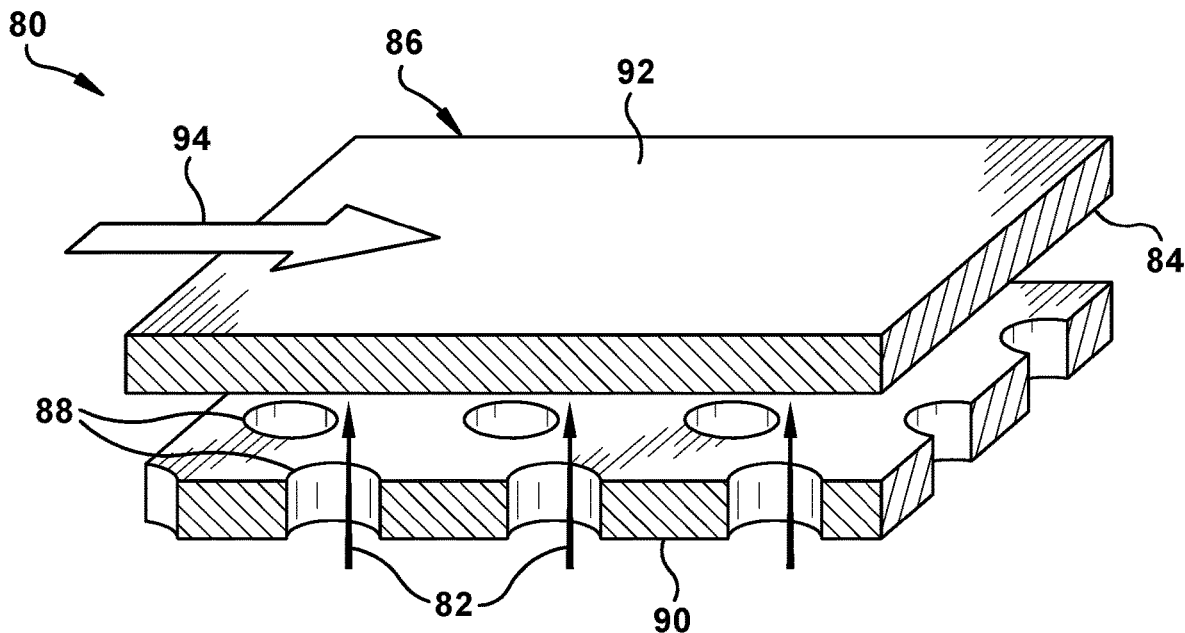
FIGS. 4A and 4B depict an example of impingement cooling prior to and after formation of a wall breach, respectively.
Figure 4B:
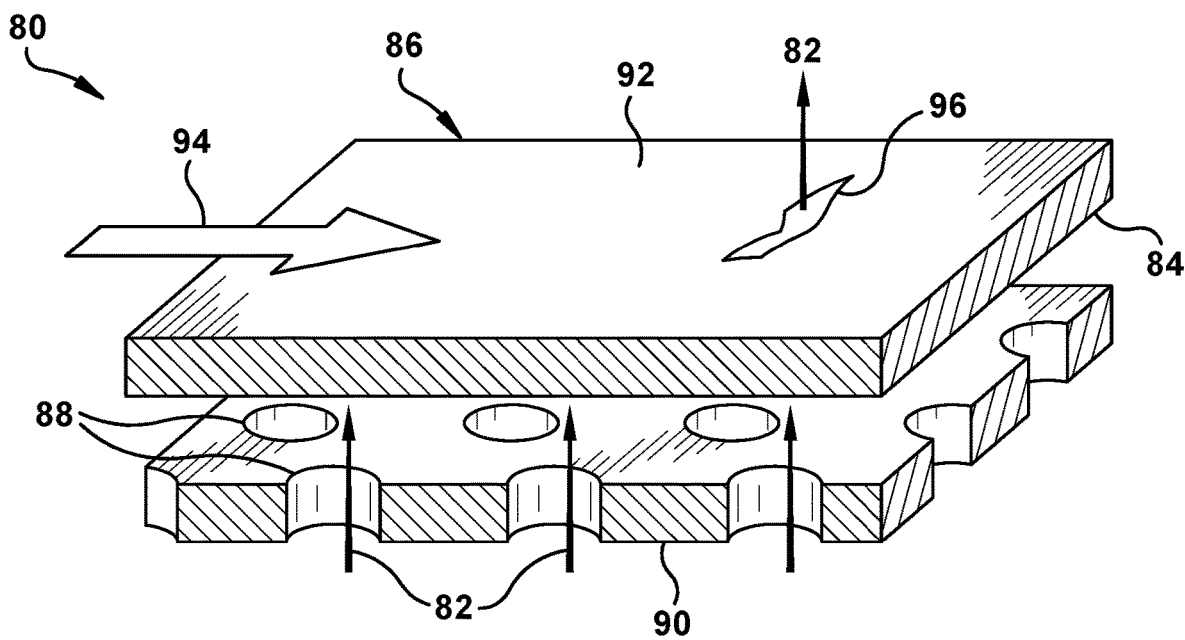
Figure 5:
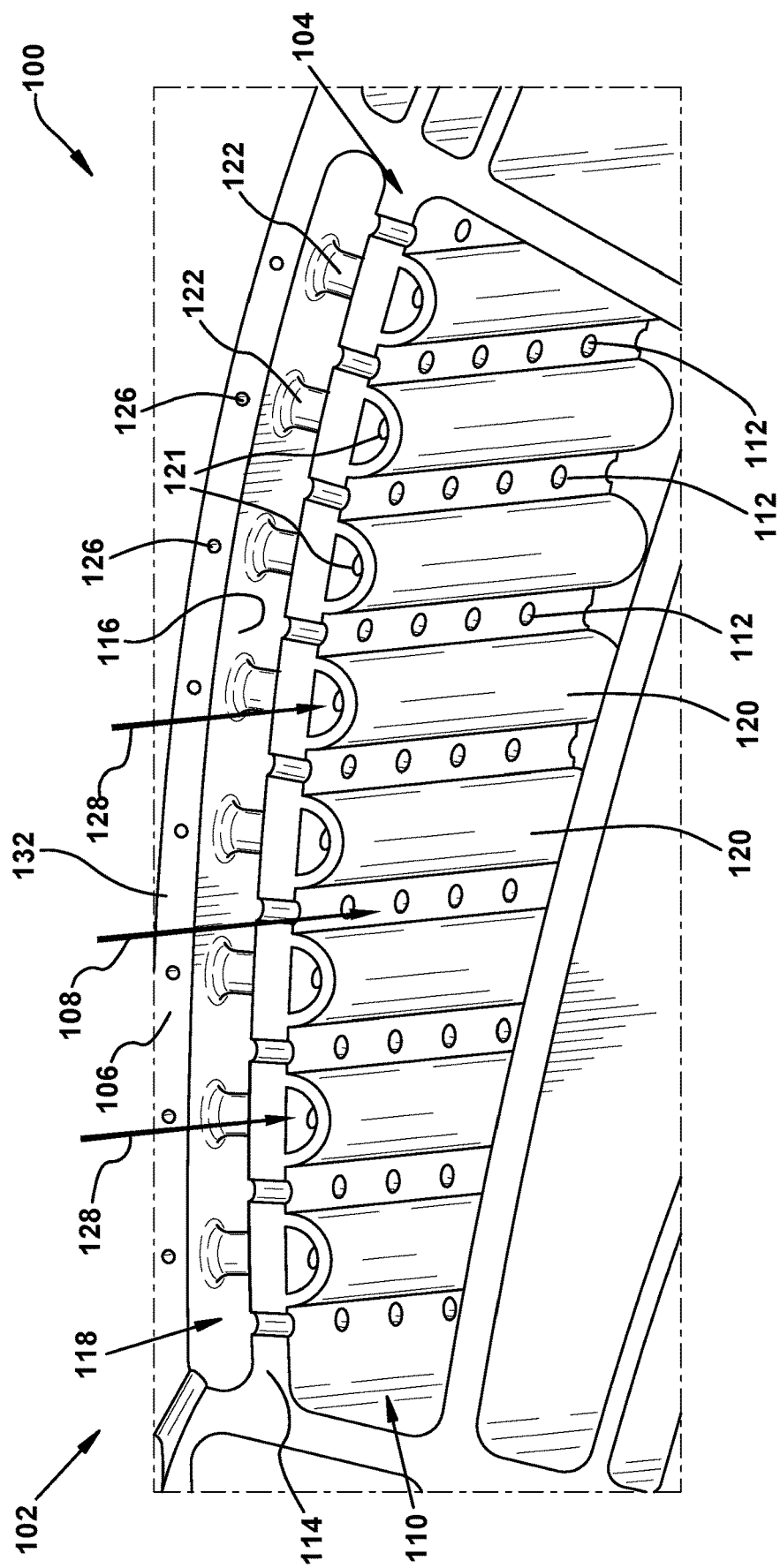
FIG. 5 depicts an independent cooling circuit in a component of a gas turbine system looking outward from the interior of the component according to embodiments.
Figure 6:
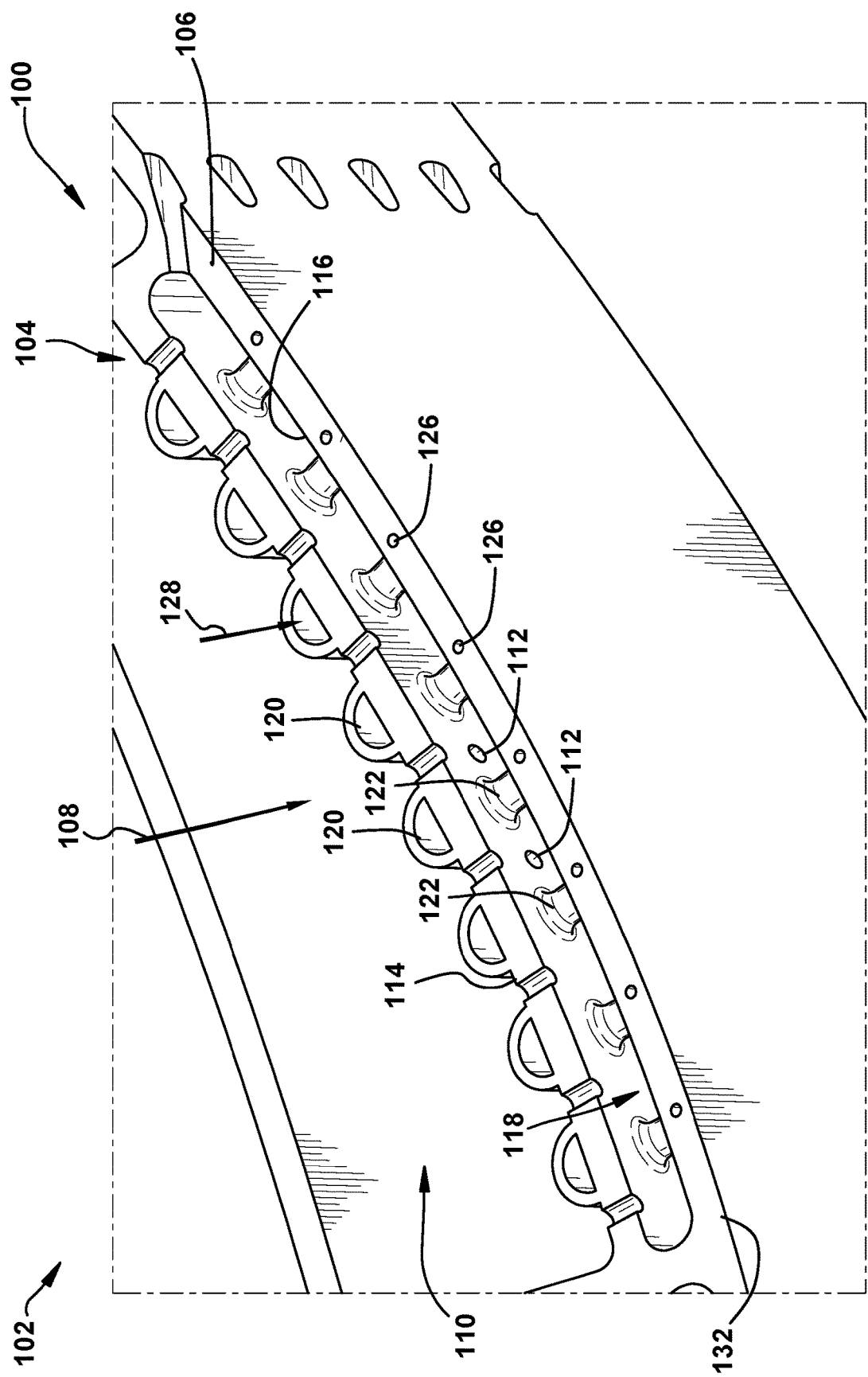
FIG. 6 depicts the independent cooling circuit of FIG. 5 looking inward from the exterior of the component according to embodiments.
Figure 7:
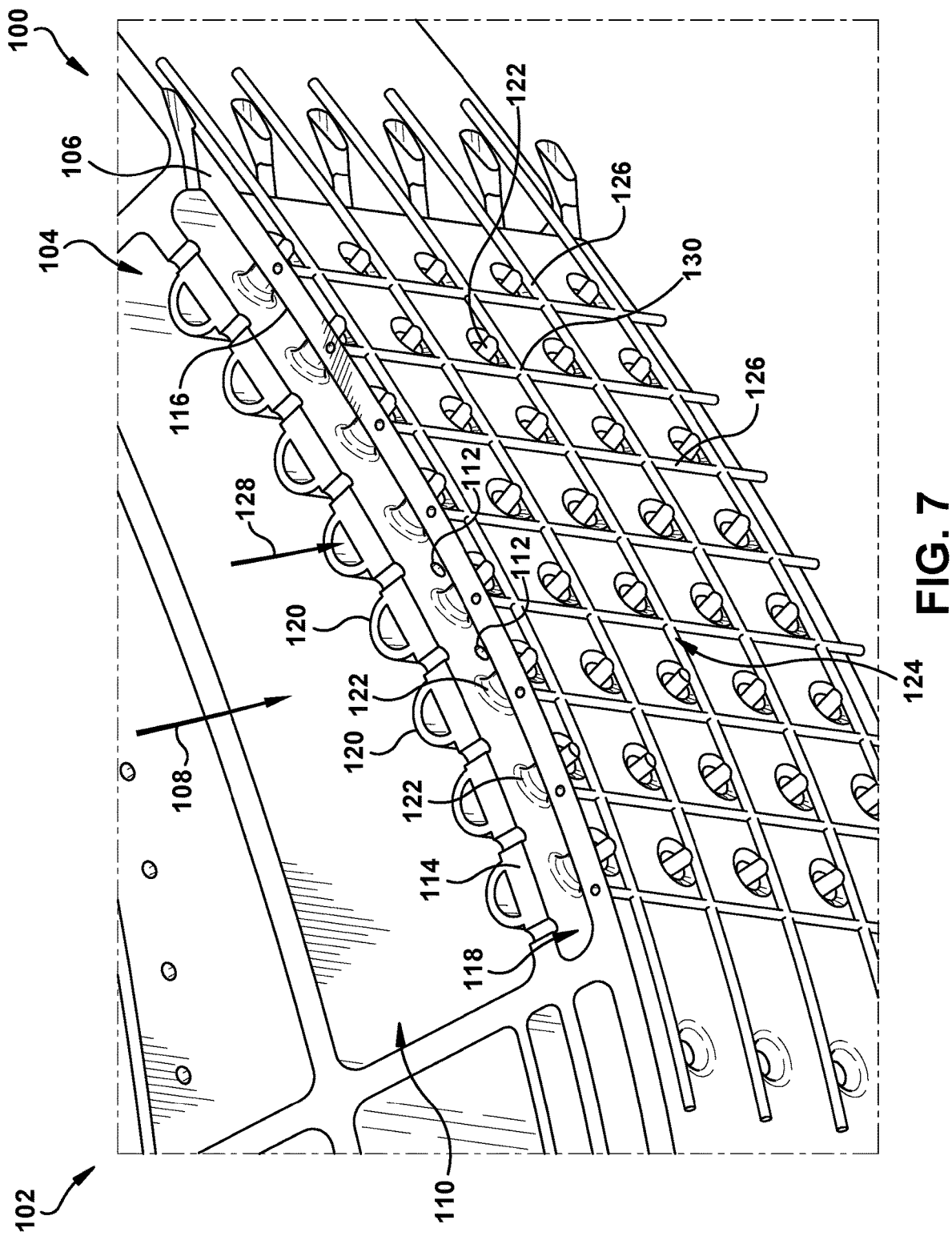
FIG. 7 depicts the independent cooling circuit of FIG. 6 with a portion of the exterior wall removed to show the interconnected circuit of cooling channels according to embodiments.

FIG. 4A depicts an example of impingement cooling in a component 80 of a gas turbine system (e.g., gas turbine system 10, FIG. 1). As shown, a supply of a cooling fluid 82 is directed against an inner surface 84 of an exterior wall 86 of the component 80 though a plurality of openings 88 formed in an impingement plate 90. The outer surface 92 of the exterior wall 86 of the component 80 is exposed to a hot gas flow 94. FIG. 4B depicts the component 80 with a breach 96 extending through the exterior wall 86. As shown, a portion of the cooling fluid 82 escapes through the exterior wall 86 of the component 80 through the breach 96, reducing available cooling to the component 80 causing damage to spread and potentially resulting in component failure.

According to embodiments, an independent cooling circuit is provided to deliver an additional, independent supply of cooling fluid to a component of a gas turbine system in response to a partial or full wall breach. The component may include, for example, a turbine blade, nozzle airfoil, shroud segment, combustion liner, or other component that may require cooling during operation of the gas turbine system. At least one interconnected circuit of cooling channels may be embedded within an exterior wall of the component. A plurality of coolant feed channels are provided within the component (e.g., within/on an impingement plate or insert, within/on an interior wall, and/or the like). A plurality of feed tubes fluidly couple the coolant feed channels and each interconnected circuit of cooling channels embedded within the exterior wall of the component. During normal operation (e.g., the absence of a partial or full breach in the exterior wall of the component), cooling fluid does not flow through the independent cooling circuit, since there is no outlet for the cooling fluid. However, when a partial or full wall breach occurs and exposes at least a portion of an interconnected circuit of cooling channels embedded within the exterior wall of the component, a flow path is created, which allows a supply of cooling fluid to flow toward the affected area through the independent cooling system. The cooling provided by this additional, independent flow of cooling fluid may extend the life of the component (e.g., reduce/prevent additional spallation in the area of the breach) after surface damage has occurred without affecting the baseline cooling effectiveness (e.g., impingement cooling) within the component.

A first embodiment of an independent cooling circuit 100 for a component 102 of a gas turbine system 10 (FIG. 1) according to embodiments is illustrated in FIGS. 5-10. The component 102 may comprise any component of a gas turbine system 10 that may require cooling including, without limitation, a turbine blade, nozzle airfoil, shroud segment, combustion liner, etc. In this example, an impingement cooling arrangement 104 is used to cool an exterior wall 106 of the component 102. For example, to provide impingement cooling, a supply of cooling fluid 108 may be directed into an internal cavity 110 of the component 102 during operation of the gas turbine system 10. The supply of cooling fluid 108 may be provided, for example, by bleeding off a supply of air discharged by the compressor section 12 (FIG. 1) of the gas turbine system 10. The cooling fluid 108 flows from the internal cavity 110, through a plurality of impingement holes 112 formed in an impingement plate 114, into an impingement cavity 118, and against an interior surface 116 of the exterior wall 106 of the component 102. After impinging against the interior surface 116 of the exterior wall 106, the cooling fluid 108 may be directed from the impingement cavity 118 to one or more interior/exterior areas of the component 102 (e.g., for film cooling). Although described in this and other embodiments in conjunction with impingement cooling, the independent cooling circuit 100 may be used together with other cooling arrangements (e.g., convection cooling, etc.).

The independent cooling circuit 100 depicted in FIGS. 5-10 (referred to concurrently) includes a plurality of coolant feed channels 120 (although not always required depending on application), a plurality of feed tubes 122 connecting the impingement plate 114 to the exterior wall 106, and an interconnected circuit 124 (FIGS. 7-10) of cooling channels 126 embedded within the exterior wall 106 of the component 102. The interconnected circuit 124 of cooling channels 126 is fully enclosed within the exterior wall 106 of the component 102, such that none of the cooling channels 126 extends to or is exposed at the outer surface 132 (e.g., the hot gas surface) of the exterior wall 106. The coolant feed channels 120 may be attached to the impingement plate 114, formed as part of or within the impingement plate 114, or provided in any other suitable manner. According to embodiments, the nominal location of the feed tubes 122 may be midway between the intersections 130 to ensure coolant feed at a breach which is most likely to occur at the intersections 130. In other embodiments, the feed tubes 122 may be located at or near the intersections 130.

Each of the coolant feed channels 120 is fluidly coupled, via a plurality of openings 121 in the impingement plate 114 and a plurality of the feed tubes 122, to the interconnected circuit 124 of cooling channels 126. The coolant feed channels 120 are each fluidly coupled to a pressurized supply of cooling fluid 128 that is independent of the supply of cooling fluid 108 provided to the impingement cooling arrangement 104. The supply of cooling fluid 128 may be provided by bleeding off a supply of air discharged by the compressor section 12 of the gas turbine system 10, or in any other suitable manner (e.g., a source of compressed air provided by a source other than the compressor section 12 of the gas turbine system 10). The interconnected circuit 124 of cooling channels 126 does not include an outlet for the cooling fluid 128. The coolant feed channels 120, if required, may also include individual passages feeding each feed tube 122. In other embodiments, the coolant feed channels 120 may be integral to the exterior wall 106.

In the embodiment shown in FIGS. 5-10, the cooling channels 126 of the interconnected circuit 124 may be embedded within the exterior wall 106 of the component 102 at approximately the same distance from the outer surface 132 of the exterior wall 106 (e.g., in a planar configuration). Further, the feed tubes 122 may extend approximately the same distance into the exterior wall 106 to the cooling channels 126 of the interconnected circuit 124. Multiple intersections 130 may be provided to fluidly interconnect all of the cooling channels 126 of the interconnected circuit 124. The cooling channels 126 may be arranged in a grid-like pattern (e.g., a rectangular grid) within the exterior wall 106 and may extend linearly between the feed tubes 122 and/or between the intersections 130.

In other embodiments, the cooling channels 126 (or portions thereof) of the interconnected circuit 124 may be embedded within the exterior wall 106 at different distances from the outer surface 132 of the exterior wall 106. This may require the feed tubes 122 to extend different distances into the exterior wall 106 to the cooling channels 126 of the interconnected circuit 124. In addition, in other embodiments, instead of using a single pressurized supply of cooling fluid and a single interconnected circuit of cooling channels, multiple independent circuits of cooling channels may be used. A single pressurized supply of cooling fluid may be fluidly coupled to all of the circuits of cooling channels, or multiple, separate pressurized supplies of cooling fluid may be used, each fluidly coupled to one or more of the circuits of cooling channels. In embodiments where cooling feed channels 120 are not used, the pre-impingement cooling fluid 108 may be fed through the plurality of feed tubes 122 into the interconnected circuit 124 of cooling channels 126.

Figure 10:
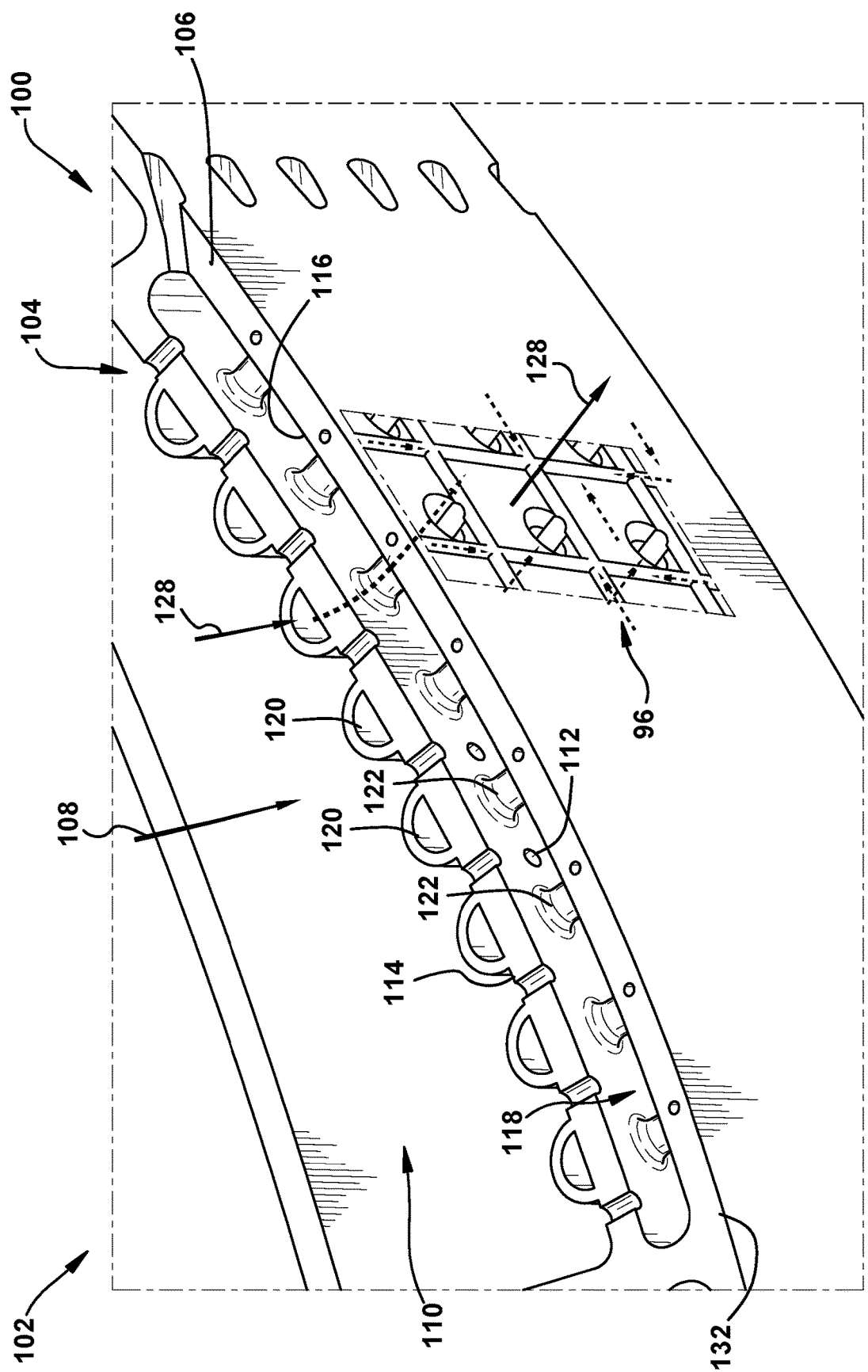
FIG. 10 depicts the operation of the independent cooling circuit of FIG. 5 after a partial or full exterior wall breach according to embodiments.
Figure 11:
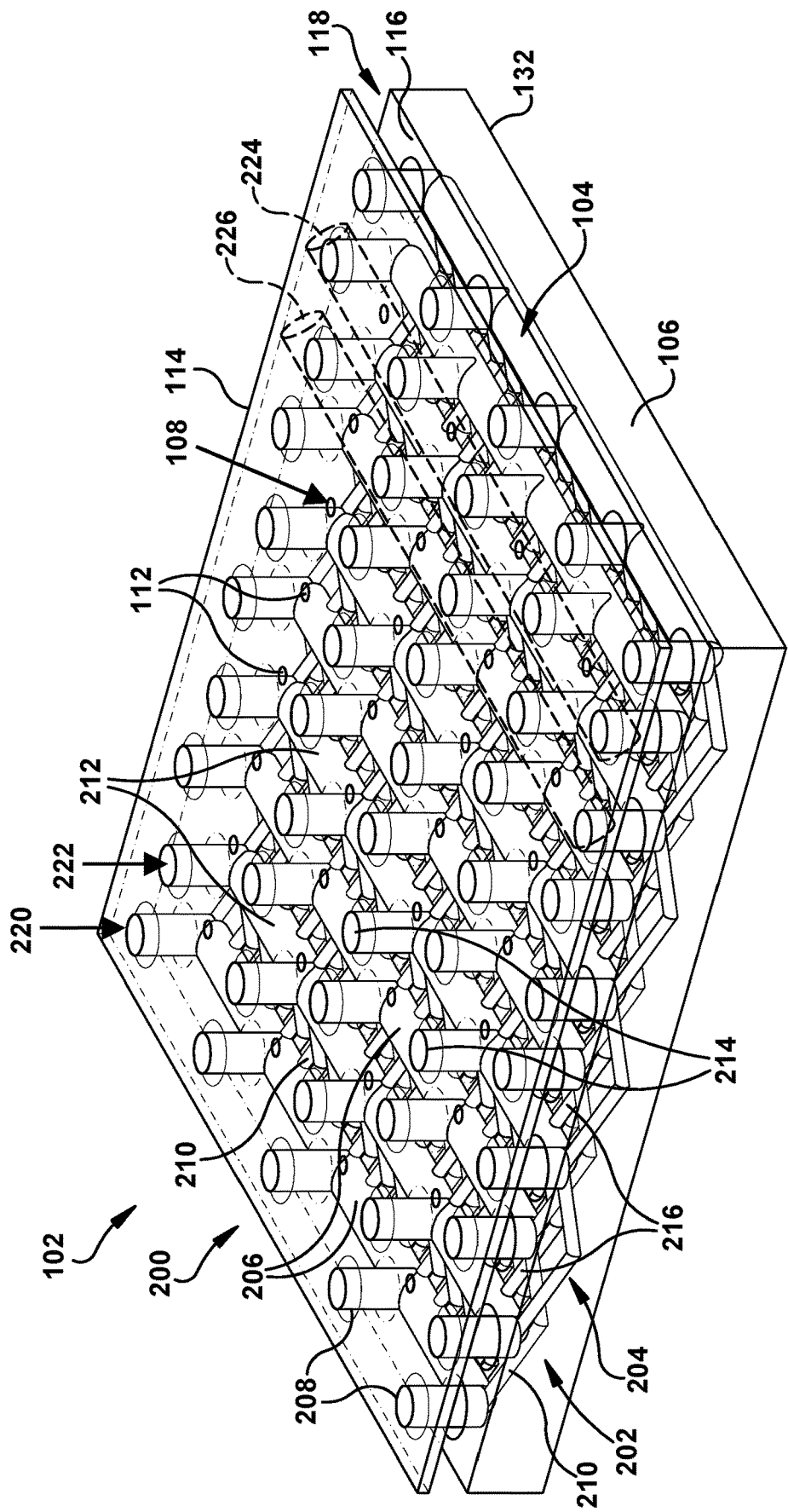
FIG. 11 depicts an independent cooling circuit in a component of a gas turbine system according to additional embodiments.
Figure 12:
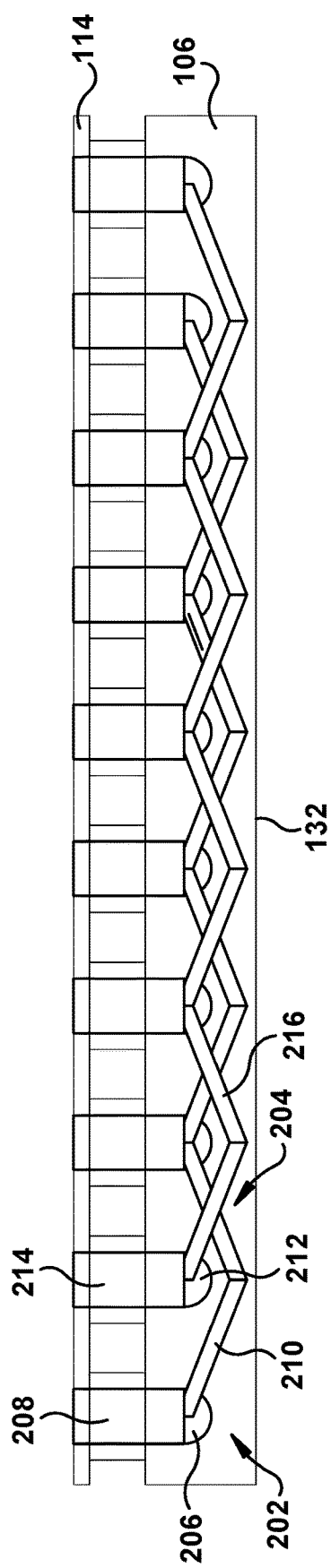
FIG. 12 depicts a cross-sectional view of the independent cooling circuit of FIG. 11 according to additional embodiments.
Figure 13:
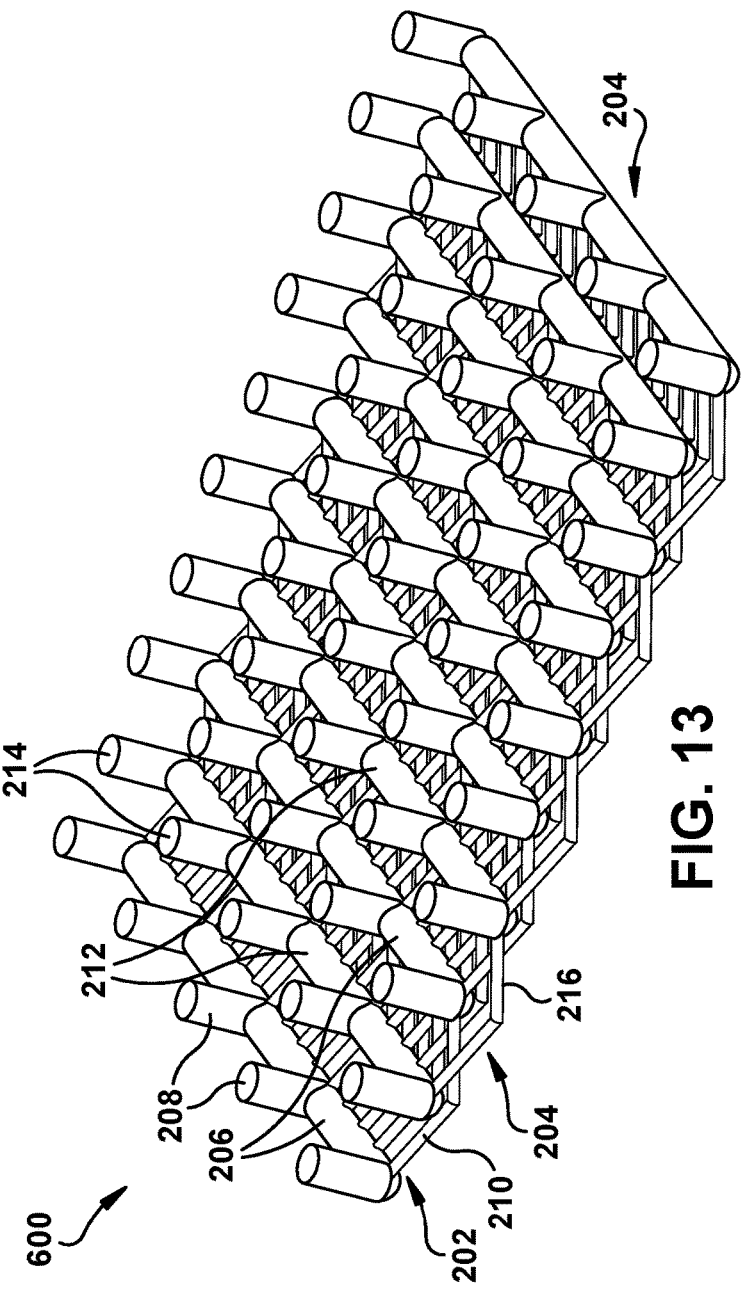
FIG. 13 depicts another view of the independent cooling circuit of FIG. 11 according to additional embodiments.

Referring again to FIGS. 5-10, during normal operation (e.g., the absence of a partial or full breach in the exterior wall 106 of the component 102), there is no flow of the cooling fluid 128 through the independent cooling circuit 100, since the interconnected circuit 124 of cooling channels 126 is embedded and fully enclosed within the exterior wall 106 and does not include an outlet for the cooling fluid 128. However, as shown in FIG. 10, in response to a formation of a partial or full wall breach 96 in the exterior wall 106 of the component 102, at least a portion of the cooling channels 126 in the exterior wall 106 of the component 102 may become exposed, providing an outlet for the cooling fluid 128. To this extent, the cooling fluid 128 can now flow thru the cooling channels 126 exposed by the wall breach 96. In particular, the cooling fluid 128 may flow through the coolant feed channels 120, the plurality of feed tubes 122, and the cooling channels 126 of the interconnected circuit 124 toward and out of the cooling channels 126 exposed by the wall breach 96. The cooling fluid 128 ultimately flows out of the exposed cooling channels 126 in the breach 96 to an exterior of the component 102. In general, the flow rate of the cooling fluid 128 increases in the channels closest to the breach 96. The flow of cooling fluid 128 provides additional cooling to the component 102 in the area adjacent the wall breach 96, independently of any cooling provided by the impingement cooling arrangement 104. The additional cooling provided by the cooling fluid 128 may, for example, reduce additional spalling or prevent additional spalling from occurring in the area of the breach 96. This may prevent the breach 96 from increasing in size and may extend the operational life of the component 102.

The independent cooling system 100 includes a single pressurized supply of cooling fluid 128, a plurality of coolant feed channels 120, a plurality of intersections 130 connecting the interconnected circuit 124 of cooling channels 126, and a plurality of feed tubes 122. Another embodiment of an independent cooling circuit 200 is depicted in FIGS. 11-14, referred to concurrently. The independent cooling circuit 200 includes a plurality (e.g., two in this example), of independent, unidirectionally interwoven circuits 202, 204.

The circuit 202 includes a plurality of headers 206, a plurality of feed tubes 208 fluidly coupled to each header 206 and connecting the impingement plate 114 to the exterior wall 106, and a plurality of cooling channels 210 extending between and fluidly coupled to the headers 206. Similarly, the circuit 204 includes a plurality of headers 212, a plurality of feed tubes 214 fluidly coupled to each header 212 and connecting the impingement plate 114 to the exterior wall 106, and a plurality of cooling channels 216 extending between and fluidly coupled to the headers 212.

Figure 14:
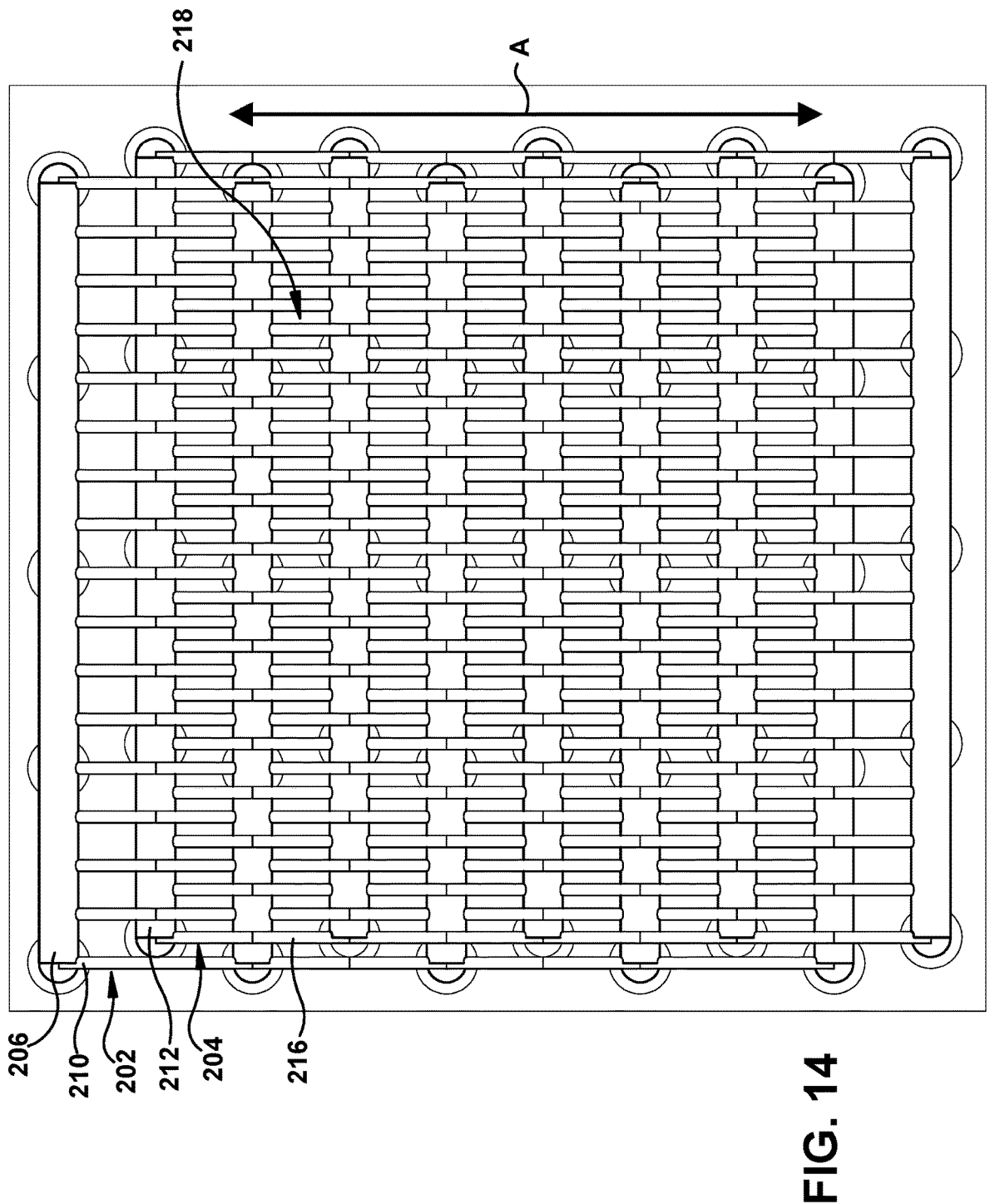
FIG. 14 depicts another view of the independent cooling circuit of FIG. 11 according to additional embodiments.

The cooling channels 210, 216 and their headers 206, 212 are embedded within the exterior wall 106 of a component 102 of a gas turbine system 10 (FIG. 1), and extend within the external wall 106 in the same direction as indicated by arrow A (FIG. 14). Each of the circuits 202, 204 of cooling channels 210, 216 is fully enclosed within the exterior wall 106 of the component 102, such that none of the cooling channels 210, 216 extends to or is exposed at the outer surface 132 of the exterior wall 106 of the component 102.

Unlike the cooling channels 126 of the interconnected circuit 124 described above with regard to FIGS. 5-10, which extend linearly between the feed tubes 122 and/or between the intersections 130, the cooling channels 210, 216 in the circuits 202, 204 of the independent cooling circuit 200 may have a non-linear configuration (e.g., a zig-zag configuration as shown, a sinusoidal configuration, etc.). As depicted in FIGS. 11-14, for example, the cooling channels 210 in the circuit 202 may extend and weave in a zig-zag manner between the headers 206 within the external wall 106, while passing around the headers 212 of the circuit 204. Similarly, the cooling channels 216 in the circuit 204 may extend and weave in a zig-zag manner (in parallel to the cooling channels 210) between the headers 212 within the external wall 106, while passing around the headers 206 of the circuit 202. To this extent, as shown most clearly in FIG. 14, the cooling channels 210 of the circuit 202 and the cooling channels 216 of the circuit 204 form a fabric 218 of cooling channels 210, 216 within the external wall 206 of the component 102. Further, as shown most clearly in FIG. 12, the distance between the cooling channels 210, 216 and the outer surface 132 of the exterior wall 106 varies within and along the external wall 106.

According to embodiments, a supply of cooling fluid 220, 222 may be provided to the circuits 202, 204, respectively, of the independent cooling circuit 200 via the feed tubes 208, 214. The supplies of cooling fluid 220, 222 may be independent of one another and may be provided by one or more different sources of cooling fluid (e.g., by bleeding off different portions of the of air discharged by the compressor section 12 of the gas turbine system 10, by reusing the cooling fluid 108, etc.). The cooling fluid 220, 222 may be provided directly to the feed tubes 208, 214 (e.g., from an internal cavity 110 of the component 102 (FIG. 5)), or may be provided via respective sets of coolant feed channels 224, 226 (only one of each is shown in phantom in FIG. 11). The coolant feed channels 224, 226 (if used) may be attached to an impingement plate 114 in the component 102, formed as part of or within the impingement plate 114, or provided in any other suitable manner. Neither of the circuits 202, 204 of cooling channels 210, 216 includes an outlet for the supplies of cooling fluid 220, 222.

As in the embodiment illustrated in FIGS. 5-10, an impingement cooling system 104 may be provided to cool the exterior wall 106 of the component 102. To provide impingement cooling, a supply of cooling fluid 108 is directed into an internal cavity 110 (see, e.g., FIG. 5) of the component 102 during operation of the gas turbine system 10. The cooling fluid 108 flows from the internal cavity 110, through a plurality of impingement holes 112 (e.g., formed in the impingement plate 114), into an impingement cavity 118, and against an interior surface 116 of the exterior wall 106 of the component 102.

During normal operation (e.g., the absence of a partial or full breach in the exterior wall 106 of the component 102), there is no flow of cooling fluid 220, 222 through either of the circuits 202, 204 of cooling channels 210, 216 of the independent cooling circuit 200, since the circuits 202, 204 of cooling channels 210, 216 are embedded and fully enclosed within the exterior wall 106 and do not include outlets for the cooling fluid 220, 222.

When a partial or full wall breach 96 (see, e.g., FIG. 10) occurs in the exterior wall 106, at least a portion of one or more of the cooling channels 210, 216 in the exterior wall 106 of the component 102 may become exposed. Exposure of one or more of the cooling channels 210 in the circuit 202 creates an outlet for the cooling fluid 220. As a result, the cooling fluid 220 can now flow through the feed tubes 208 and headers 206 into the cooling channels 210 toward (and out of) the cooling channel(s) 210 exposed by the wall breach 96. Similarly, exposure of one or more of the cooling channels 216 in the circuit 204 creates an outlet for the cooling fluid 222. The cooling fluid 222 can now flow through the feed tubes 214 and headers 212 into the cooling channels 216 toward (and out of) the cooling channel(s) 216 exposed by the wall breach 96. The cooling fluid 220 will flow through the circuit 202 of cooling channels 210 only in response to an exposure of one or more of the cooling channels 210. Likewise, the cooling fluid 222 will flow through the circuit 204 of cooling channels 216 only in response to an exposure of one or more of the cooling channels 216. To this extent, one or both of the circuits 202, 204 of cooling channels 210, 216 may be activated depending on which cooling channel(s) 210, 216 have been exposed by the wall breach 96.

The flow of cooling fluid 220 and/or 222 via the independent cooling circuit 200 provides additional cooling to the component 102 in the area adjacent the wall breach 96, independently of any cooling provided by the impingement cooling arrangement 104. The additional cooling provided by the cooling fluid 220 and/or 222 may, for example, reduce additional spalling or prevent additional spalling from occurring in the area of the breach 96. This may prevent the breach 96 from increasing in size and may extend the operational life of the component 102.

The use of a plurality of independent circuits 202, 204 and the non-linear configuration of the cooling channels 210, 216 provides a longer flow path within the exterior wall 106 of the component 102, which may enhance the heat transfer to the cooling fluid 220, 222 and enhance the cooling effectiveness of the independent cooling circuit 200. In addition, portions of the cooling channels 210, 216 located closer to the outer surface 132 of the external wall 106 of the component 102 may become exposed in response to the formation of a shallower/smaller breach 96. As a result, the independent cooling circuit 200 may activate sooner in response to a spallation event than the independent cooling circuit 100, which has a planar configuration.

Figure 8:
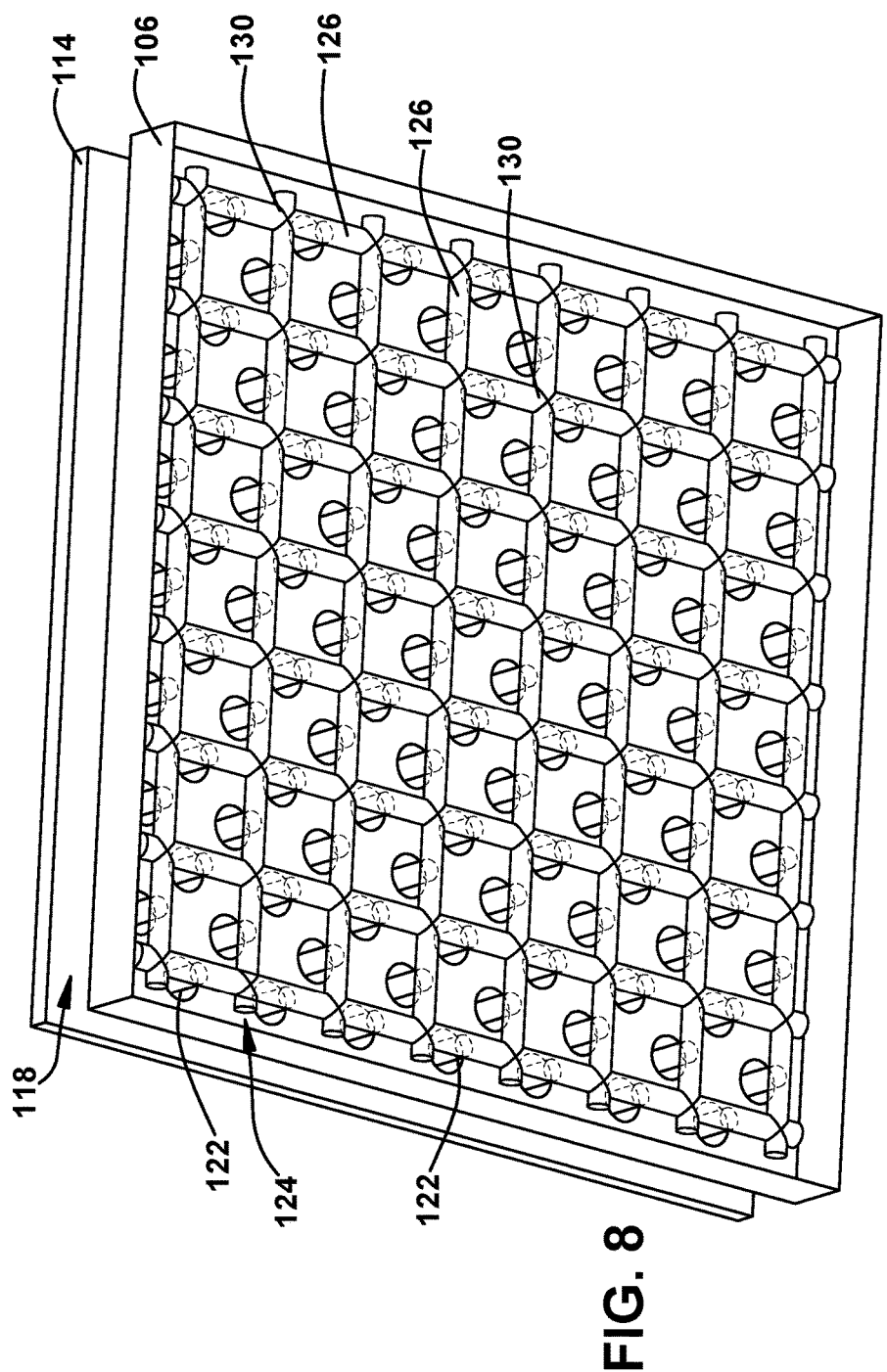
FIG. 8 depicts another view of the independent cooling circuit of FIG. 5 with a portion of the exterior wall of the component removed according to embodiments.
Figure 9:
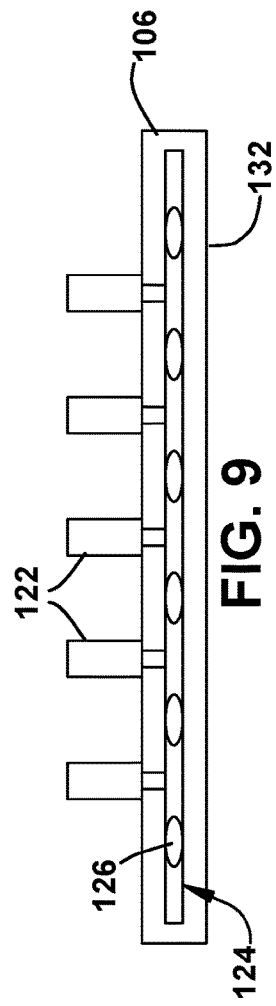
FIG. 9 depicts a cross-sectional view of the independent cooling circuit of FIG. 5 according to embodiments.

Comparing FIG. 14 to FIG. 8, it can be seen that the independent cooling circuit 200 may provide a higher density of cooling channels 210, 216 in the exterior wall 106 of the component 102 than the independent cooling circuits 100 (e.g., due to the woven configuration of the circuits 202, 204). The higher density may enhance the cooling effectiveness of the independent cooling circuit 200.

In the independent cooling circuits 100, 200, the supplies of cooling fluid may be provided independently of the main supply of cooling fluid (e.g., the supply of cooling fluid 108 used for impingement cooling) to limit any reduction in back flow margin (BFM) if a large area of cooling channel(s) becomes exposed due to a spallation event. BFM is defined as the difference between the pressure of the cooling fluid inside a component 102 of the gas turbine system 10 and the local pressure of the combustion gases 22 (FIG. 1) outside the component 102. In the independent cooling circuit 200, however, which includes multiple, independent circuits 202, 204 of cooling channels 210, 216, a combination of sources of cooling fluid may be used depending on the application. For example, one of the circuits 202, 204 of cooling channels 210, 216 may be fed by bleeding off compressed air from the compressor section 112, while the other of the circuits 202, 204 of cooling channels 210, 216 may reuse cooling fluid from a main cooling circuit in the component 102 (e.g., cooling fluid 108 used for impingement cooling in the impingement cooling arrangement 104), or some combination of such sources. In such a case, a spallation event may allow for extra cooling in the main cooling circuit while limiting reductions in the BFM.

Figure 15:
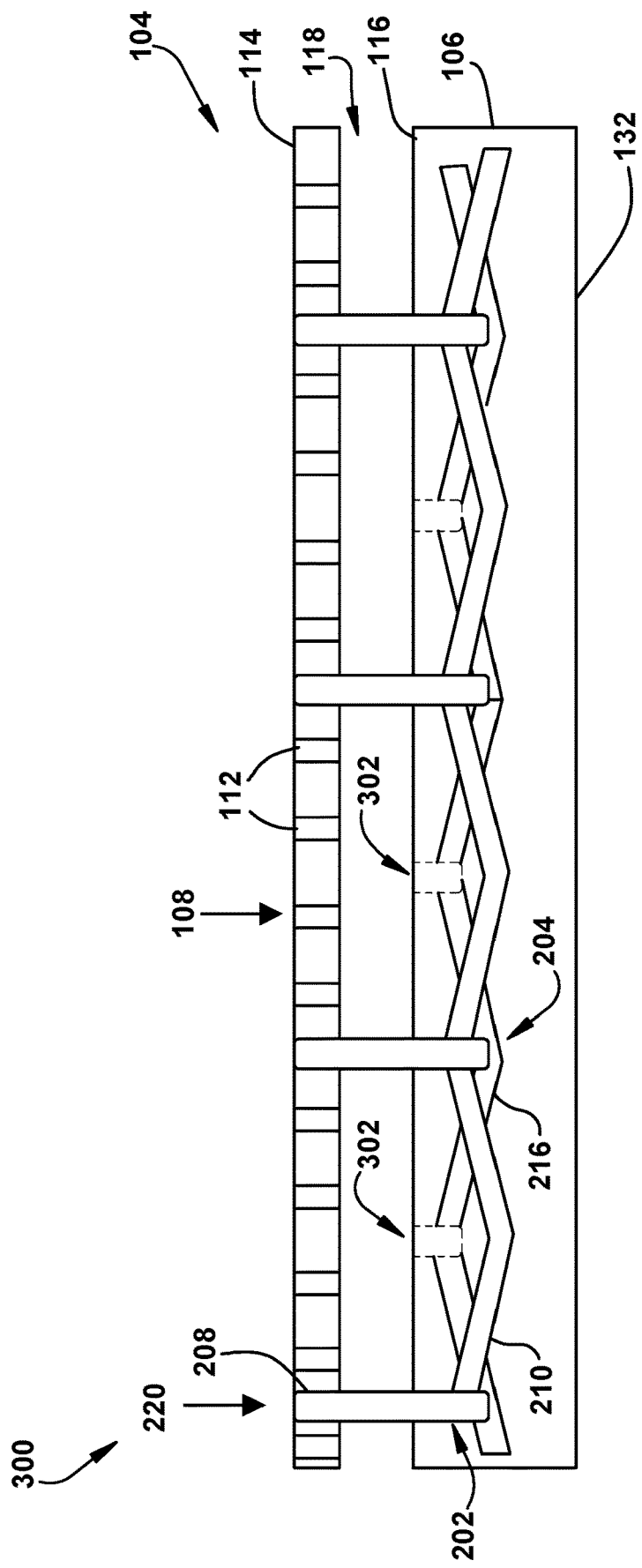
FIG. 15 depicts an independent cooling circuit according to yet another embodiment.

A modification of the independent cooling circuit 200 depicted in FIGS. 11-14 that utilizes a combination of sources of cooling fluid is illustrated in FIG. 15. The independent cooling circuit 300 in FIG. 15 operates similarly to the previously described independent cooling circuit 200. In particular, the circuit 202 of cooling channels 210 is fluidly coupled to the supply of cooling fluid 220 via feed tubes 208 and operates as described above. However, unlike in the independent cooling circuit 200, the circuit 204 of cooling channels 216 in the independent cooling circuit 300 is fluidly coupled to the impingement cavity 118 (and thus the supply of cooling fluid 108) via a plurality of openings 302 formed in the exterior wall 106 of the component 102. When a wall breach 96 in the exterior wall 106 exposes at least a portion of one or more of the cooling channels 216, the cooling fluid 108 can now flow from the impingement cavity 118 through the openings 302 into the circuit 204 of cooling channels 216 toward (and out of) the cooling channel(s) 216 exposed by the wall breach 96. In this way, the cooling fluid 108 used for impingement cooling is reused by the independent cooling circuit 300.

Various components and features of the independent cooling circuits 100, 200, 300 of the present disclosure may be formed using an additive manufacturing process. Advantageously, additive manufacturing enables the design and production of more customizable and intricate features.

As used herein, additive manufacturing may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM). In the current setting, DMLM or SLM have been found advantageous.

Figure 16:
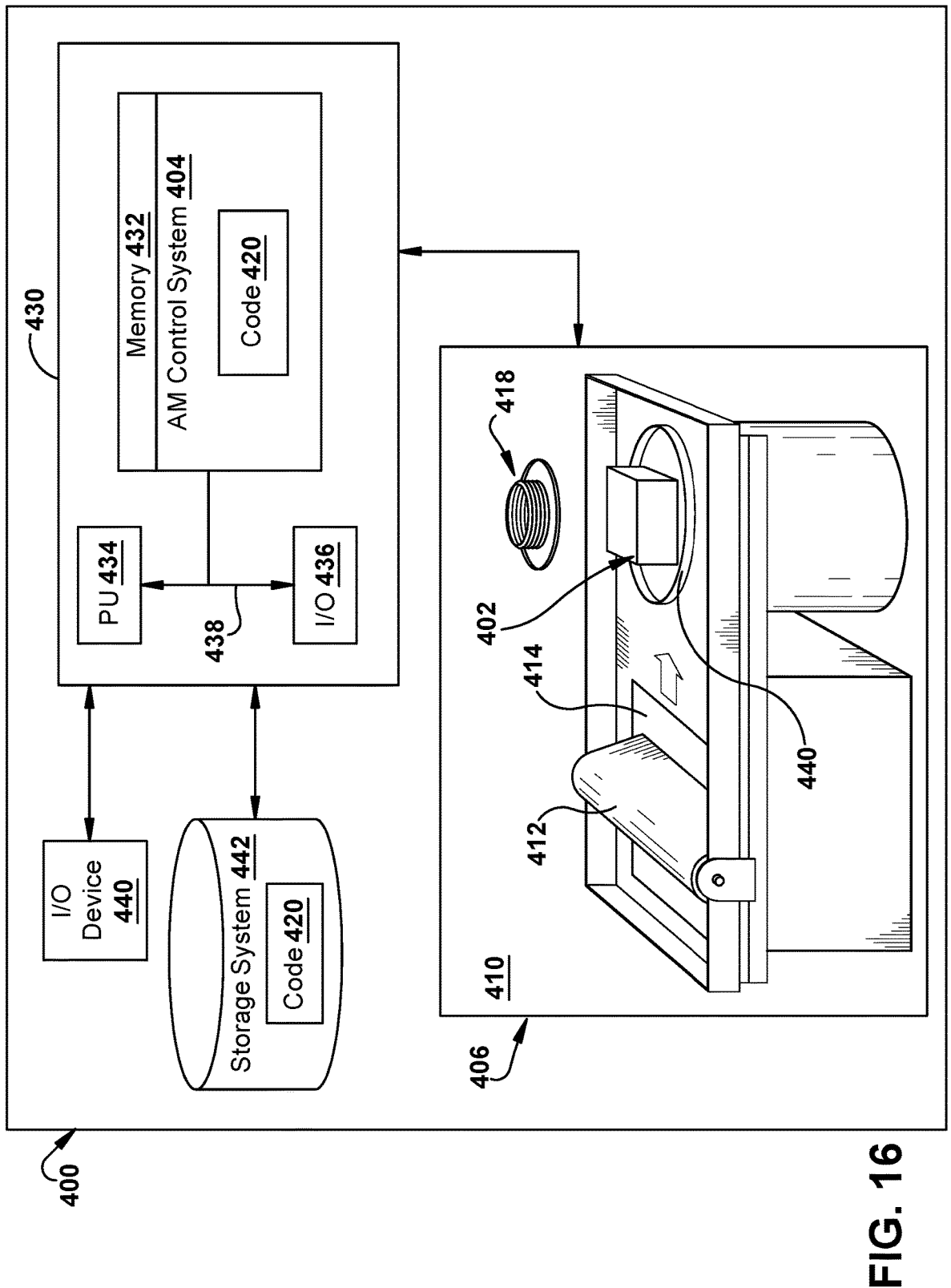
FIG. 16 depicts a block diagram of an additive manufacturing process including a non-transitory computer readable storage medium storing code representative of an object according to embodiments.

To illustrate an example of an additive manufacturing process, FIG. 16 shows a schematic/block view of an illustrative computerized additive manufacturing system 400 for generating an object 402. In this example, the system 400 is arranged for DMLM, although it should be understood that the general teachings of the disclosure are equally applicable to other forms of additive manufacturing. The AM system 400 generally includes a computerized additive manufacturing (AM) control system 404 and an AM printer 406. The AM system 400 executes code 420 that includes a set of computer-executable instructions defining the object 402 to physically generate the object 402 using the AM printer 406. Each AM process may use different raw materials in the form of, for example, fine-grain powder, liquid (e.g., polymers), sheet, etc., a stock of which may be held in a chamber 410 of the AM printer 406. According to embodiments, the object 402 may be made of a metal or metal compound capable of withstanding the environment of a gas turbine system 10 (FIG. 1). As illustrated, an applicator 412 may create a thin layer of raw material 414 spread out as the blank canvas on a build plate 444 of AM printer 406 from which each successive slice of the final object will be created. In other cases, the applicator 412 may directly apply or print the next layer onto a previous layer as defined by code 420. In the example shown, a laser or electron beam fuses particles for each slice, as defined by code 420. Various parts of the AM printer 406 may move to accommodate the addition of each new layer, e.g., a build platform 418 may lower and/or chamber 410 and/or applicator 412 may rise after each layer.

The AM control system 404 is shown implemented on a computer 430 as computer program code. To this extent, the computer 430 is shown including a memory 432, a processor 434, an input/output (I/O) interface 436, and a bus 438. Further, the computer 430 is shown in communication with an external I/O device/resource 440 and a storage system 442. In general, the processor 434 executes computer program code, such as the AM control system 404, that is stored in memory 432 and/or storage system 442 under instructions from code 420 representative of the object 402.

Additive manufacturing processes begin with a non-transitory computer readable storage medium (e.g., memory 432, storage system 442, etc.) storing code 420 representative of the object 402. For example, the code 420 may include a precisely defined 3D model of the object 402 and can be generated from any of a large variety of well-known computer aided design (CAD) software systems. The AM control system 404 executes the code 420, dividing the object 402 into a series of thin slices that it assembles using the AM printer 406 in successive layers of liquid, powder, sheet or other material.

Various components of a gas turbine system 10 (FIG. 1), or portions of such components, may be produced using an additive manufacturing (AM) process (e.g., using AM system 400, FIG. 16). For example, at least a portion of an exterior wall of a component including an interconnected circuit of cooling channels may be produced via an AM process.

In FIG. 17, for example, a wall coupon 500 for the component 102 depicted in FIGS. 5-10 has been produced (e.g., printed) via an AM process. The wall coupon 500 includes a section 502 of the exterior wall 106 of the component 102. At least a portion of the interconnected circuit 124 of cooling channels 126 is embedded within the wall section 502. The wall coupon 500 further includes a plurality of feed tubes 122 fluidly coupled to the cooling channels 126. To this extent, the wall coupon 500 forms a portion of the independent cooling circuit 100, described above. According to other embodiments, the wall coupon 500 may be formed with at least a portion of the interconnected circuits 202, 204 of cooling channels 210, 216 embedded therein.

According to embodiments, the wall coupon 500 may be produced to any size via an AM process, and may be attached to another section 504 of the component 102 to form at least a portion of the independent cooling circuit 100 (see, e.g., FIG. 18). The section 504 of the component 102 may be formed in a conventional manner (e.g., machined, cast, etc.) or may be formed using an AM process. It should be noted that the wall coupon 500 may configured for use in any of the independent cooling circuits 100, 200, 300 described herein. Attachment may be accomplished, for example, using brazing, welding, or other suitable metal-joining process. FIG. 18 depicts the wall coupon 500 attached (e.g., via brazing/welding) to an impingement plate 114 of the component 102 to form at least a portion of the independent cooling circuit 100. In other embodiments, the entire cooling structure depicted in FIG. 18 may be formed using an AM process, and may be attached to a portion of a component 102 of a gas turbine system 10.

An independent cooling circuit 100 formed using an AM printed wall coupon 500 may be strategically provided in those areas of a component 102 of a gas turbine system 10 that may be subject to spallation. This may be done, for example, without having to produce the entire component 102 using an AM process. Further, an independent cooling circuit 100 formed using an AM printed wall coupon 500 may be retrofittable into an existing component 102 of a gas turbine system 10 to repair areas previously damaged by spallation and/or to selectively provide enhanced cooling to areas of the component 102 subject to spallation as described above.

When producing the independent cooling circuits 100, 200, 300 (or portions thereof) using an AM process, excess powder removal may become a concern. Since the independent cooling circuits 100, 200, 300 do not have an outlet for the cooling fluid 128 (e.g., the circuits are purposefully dead ended), there is no easy way to used forced air to try to remove the excess powder.

According to embodiments, as depicted in FIGS. 19 and 20 and described with reference to the wall coupon 500 produced using an AM process (FIGS. 17 and 18), a plurality of small openings 600 for powder removal may be provided (e.g., formed during the AM process) in the exterior wall section 502 of the wall coupon 500. In FIGS. 19 and 20, for example, the openings 600 are shown extending from the interconnected circuit 124 of cooling channels 126 of the independent cooling circuit 100 through the exterior wall section 502 to the outer surface 132 of the wall coupon 500.

The openings 600 provide an exit that can be used for the removal of excess powder. Powder may be removed, for example, using vibration or by forcing air into the interconnected circuit 124 of cooling channels 126 and out through the openings 600. After powder removal, the openings 600 may be filled/sealed in any suitable manner (e.g., filled with metal, sealant, etc.) to close the independent cooling circuit 100. The openings 600 may be filled/sealed prior to the subsequent application of a TBC coating on the outer surface 132 of the wall coupon 500, or simply sealed by the TBC coating itself. In some cases, a spall event may unblock some of the sealed openings 600 before any of the interconnected circuit 124 of cooling channels 126 are exposed due to the formation of a breach. Cooling fluid 128 may then flow toward and out of the unblocked openings 600 via the independent cooling circuit 100, providing an immediate cooling benefit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A coolant delivery system for selectively delivering cooling fluid to a component of a gas turbine system, comprising:
   a plurality of independent circuits of cooling channels embedded within an exterior wall of the component, each independent circuit of cooling channels including a plurality of headers and a plurality of feed tubes fluidly coupling the plurality of headers to a supply of cooling fluid, wherein each independent circuit of cooling channels is fluidly coupled to an independent supply of cooling fluid; and
   an impingement plate connected to the exterior wall of the component by the plurality of feed tubes of each independent circuit of cooling channels,
   wherein, for each independent circuit of cooling channels, the cooling fluid flows through the plurality of feed tubes and the plurality of headers into each independent circuit of cooling channels only in response to a formation of a breach in the exterior wall of the component that exposes at least one cooling channel of the independent circuit of cooling channels.

2. The coolant delivery system according to claim 1, wherein in each independent circuit of cooling channels, the cooling channels extend between the plurality of headers of the independent circuit of cooling channels and are fluidly coupled to the plurality of headers of the independent circuit of cooling channels.

3. The coolant delivery system according to claim 2, wherein the cooling channels of the plurality of independent circuits of cooling channels are interwoven and extend unidirectionally within the exterior wall of the component.

4. The coolant delivery system according to claim 2, wherein in each independent circuit of cooling channels, the cooling channels extend non-linearly between the plurality of headers such that a distance between the cooling channels and an outer surface of the external wall of the component varies.

5. The coolant delivery system according to claim 2, wherein in each independent circuit of cooling channels, the cooling channels extend around the plurality of headers of other independent circuits of cooling channels.

6. The coolant delivery system according to claim 1, further comprising a wall coupon formed using an additive manufacturing process, the wall coupon including a section of the exterior wall of the component, wherein the plurality of independent circuits of cooling channels are embedded within the section of the exterior wall.

7. The coolant delivery system according to claim 6, wherein the wall coupon includes a plurality of powder removal openings extending from at least one of the plurality of independent circuits of cooling channels to an outer surface of the section of the exterior wall.

8. A gas turbine system, comprising:
   a component of the gas turbine system; and
   a cooling system for the component, the cooling system including:
      a plurality of independent circuits of cooling channels embedded within an exterior wall of the component, each independent circuit of cooling channels including a plurality of headers and a plurality of feed tubes fluidly coupling the plurality of headers to a supply of cooling fluid, wherein each independent circuit of cooling channels is fluidly coupled to an independent supply of cooling fluid; and
      an impingement plate connected to the exterior wall of the component by the plurality of feed tubes of each independent circuit of cooling channels,
   wherein, for each independent circuit of cooling channels, the cooling fluid flows through the plurality of feed tubes and the plurality of headers into each independent circuit of cooling channels only in response to a formation of a breach in the exterior wall of the component that exposes at least one cooling channel of the independent circuit of cooling channels.

9. The gas turbine system according to claim 8, wherein in each independent circuit of cooling channels, the cooling channels extend between the plurality of headers of the independent circuit of cooling channels and are fluidly coupled to the plurality of headers of the independent circuit of cooling channels, and wherein the cooling channels are interwoven and extend unidirectionally within the exterior wall of the component.

10. The gas turbine system according to claim 9, wherein in each independent circuit of cooling channels, the cooling channels extend non-linearly between the plurality of headers such that a distance between the cooling channels and an outer surface of the external wall of the component varies.

11. The gas turbine system according to claim 9, wherein in each independent circuit of cooling channels, the cooling channels extend around the plurality of headers of other independent circuits of cooling channels.

12. The gas turbine system according to claim 8, further comprising a wall coupon formed using an additive manufacturing process, the wall coupon including a section of the exterior wall of the component, wherein the plurality of independent circuits of cooling channels are embedded within the section of the exterior wall.

13. The gas turbine system according to claim 12, wherein the wall coupon includes a plurality of powder removal openings extending from at least one of the plurality of independent circuits of cooling channels to an outer surface of the section of the exterior wall.

* * * * *